United States Patent
Matusz et al.

(10) Patent No.: US 7,681,031 B2
(45) Date of Patent: Mar. 16, 2010

(54) METHOD AND APPARATUS TO PROVIDE AUTHENTICATION CODE

(75) Inventors: Pawel Matusz, Rumia Pomorskie (PL); Artur Miron, Gdynia Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 1243 days.

(21) Appl. No.: 11/167,125

(22) Filed: Jun. 28, 2005

(65) Prior Publication Data

US 2006/0294361 A1    Dec. 28, 2006

(51) Int. Cl.
*H04L 29/06* (2006.01)
*H04L 9/00* (2006.01)
*G06F 7/04* (2006.01)
*G06F 9/00* (2006.01)
*H04L 9/06* (2006.01)
*H04L 9/30* (2006.01)

(52) U.S. Cl. .................. 713/151; 713/152; 713/162; 726/3; 726/4

(58) Field of Classification Search .................. 713/151
See application file for complete search history.

(56) References Cited

U.S. PATENT DOCUMENTS 7,174,452 B2 *   2/2007   Carr ........................... 713/151

FOREIGN PATENT DOCUMENTS

EP           1 432 271 A      6/2004
WO      WO 2009018512 A1 *   2/2009

OTHER PUBLICATIONS

Zhimin Yang, Adam C. Champion, Boxuan Gu, Xiaole Bai, Dong Xuan, "Link-layer protection in 802.11i WLANS with dummy authentication", Mar. 2009, WiSec '09: Proceedings of the second ACM conference on Wireless network security, pp. 131-138.*
U.S. Appl. No. 10/809,607, filed Mar. 24, 2004, Matusz et al.
Sood Correbt Corp K: "TCP Configurable Message Authentication Code (MAC) Option" IETF Standard-Working-Draft, Internet Engineering Task Force, IETF, CH, Feb. 2004, XP015035575.
Office Action for GB0721289.7 mailed on Oct. 2, 2009.

* cited by examiner

*Primary Examiner*—Matthew B Smithers
*Assistant Examiner*—Courtney D Fields
(74) *Attorney, Agent, or Firm*—Shiloh et al.

(57) ABSTRACT

Briefly, a method and apparatus to authenticate messages according to a message authentication code provided with a frame over a transport layer of a communication channel.

20 Claims, 2 Drawing Sheets

METHOD AND APPARATUS TO PROVIDE AUTHENTICATION CODE

CROSS REFERENCE TO RELATED APPLICATIONS

This application is related to U.S. patent application Ser. No. 10/809,607, entitled "FRAME AUTHENTICATION FOR WIRELESS NETWORK" filed on Mar. 24, 2004, and assigned to the assignee of the present application.

BACKGROUND OF THE INVENTION

Radio telephone communication systems, such as, for example cellular communication system, may operate according to formal and public standards. The standards may be classified according to generations, for example, first generation (1G), second generation (2G), third generation (3G) or the like. 3G standards may include a standard for Universal Mobile Telecommunication System (UMTS). The UMTS system may be functionally divided into three main parts: User Equipment (UE), UMTS Terrestrial Radio Access Network (UTRAN and Core Network (CN), if desired. The UE may include one or more user's mobile terminals, which may be referred to as Mobile Equipment (ME); the UTRAN may be capable of handling all radio-related functionality; and the CN may be capable of switching and routing calls and data connections to external networks, if desired.

Some of the system units such as, for example, UTRAN and CN, may be operably connected trough interfaces. The interfaces may include physical links, for example, leased lines extending through public areas and/or network infrastructures that are hard to control. User data and some UMTS signaling frames that may by available on some interfaces may not be adequately protected by authentication and integrity means.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
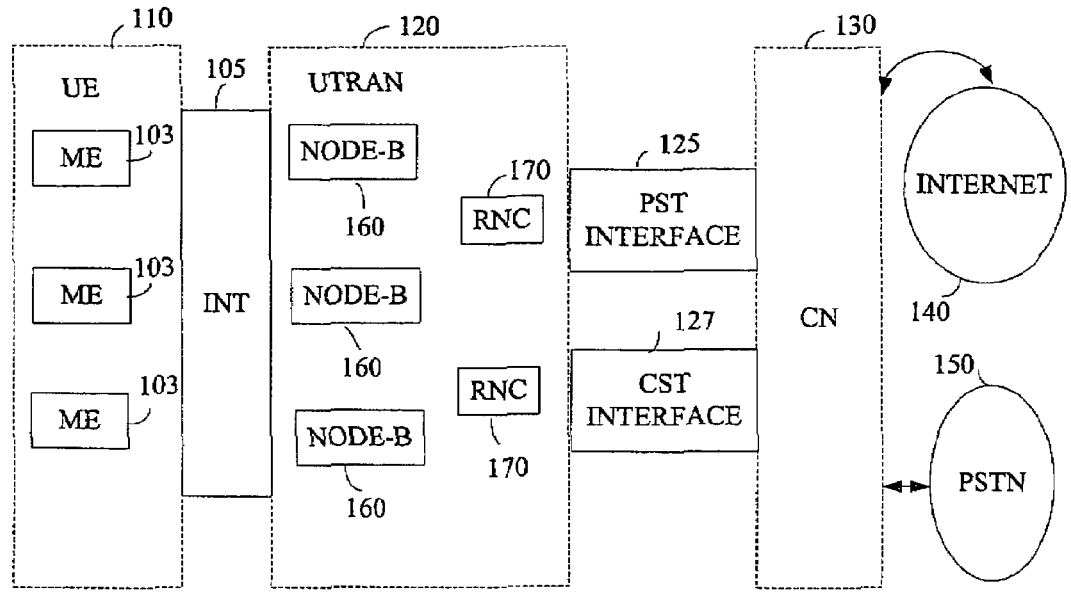
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components, and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as, for example, "processing," "computing," "calculating," "determining," "establishing", "sending", "exchanging" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage medium that may store instructions to perform actions and/or process, if desired.

The term "node" as used herein may refer any element, module, component, board, device or system that may process a signal representing information. The signal may be, for example, an electrical signal, optical signal, acoustical signal, chemical signal, and so forth. The embodiments are not limited in this context.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

It should be understood that the present invention may be used in a variety of applications. Although the present invention is not limited in this respect, the circuits and techniques disclosed herein may be used in many apparatuses such as network nodes and interfaces of a radio system. Types of cellular radiotelephone systems intended to be within the scope of the present invention include, although are not limited to, Code Division Multiple Access (CDMA) and wideband CDMA (WCDMA) cellular radiotelephone portable devices for transmitting and receiving spread spectrum signals, Global System for Mobile communication (GSM) cellular radiotelephone, General Packet Radio Service (GPRS), Extended GPRS, and the like.

Turning first to FIG. 1, a wireless communication system 100, for example, a cellular communication system is shown. Although the scope of the present invention is not limited in this respect, the exemplary cellular communication system 100 may be include some components which defined by an ITU 3GPP/UMTS standard. According to some embodiments of the invention, cellular communication system 100 may include units such as, for example an UE 110, an UTRAN 120, a CN 130, the Internet 140 and a public switched telephone network (PSTN) 150. According to this embodiment of the invention, interfaces 105, 125 and 127 may be used to couple units 110, 120 and 130 of cellular communication system 100, if desired. Interface 105 may be used to operably couple UE 110 to UTRAN 120; interface 125, which may be a packet switched traffic (PST) interface, may be used to transfer data between UTRAN 120, CN 130, internet 140 and/or PSTN 150; and interface 127, which may be a circuit switched traffic (CST) interface, may be used to transfer, for example, voice from/to CN 130 and/or PSTN 150, if desired.

In operation, cellular communication system 100 may be able to transfer voice and data from/to at least one ME 103 to/from internet 140 and/or PSTN 150 over interfaces 105, 125 and 127. UTRAN 120 may include one or more radio network controllers (RNC) 170 and network nodes 160, for example, Node-B. According to some exemplary embodiments of the present invention, RNC 170 may be capable of managing and/or signaling data exchanged between network elements, which data may be passed through interfaces 105, 125 and 127 in the form of data frames. Furthermore, RNC 170 may be capable of authenticating voice and data messages and transferring the authenticated voice and data messages on a transport layer, e.g., a lowest layer of a transport layer of a communication channel, if desired.

According to some embodiments of the invention, ME 103 may be capable of receiving authenticated messages from the cellular communication system units. Furthermore, some MEs may be capable to de-authenticating the authenticated messages, and some other MEs may not be able to de-authenticate the authenticated messages.

According to embodiments of the invention the transport layer may be the lowest layer of the communicating channel. The messages may be transferred by transport layer protocols such as, for example, Asynchronous Transfer Mode (ATM), Internet Protocol (IP) or the like.

According to some embodiments of the present invention, a message authentication code (MAC) may be transferred over the transport layer (e.g., lowest communication layer) and may be used to authenticate messages of higher communication layers. Network nodes and/or other communication system units may provide authentication keys to authenticate messages of higher layers, although the scope of the present invention is in no way limited in this respect.

Figure 2:
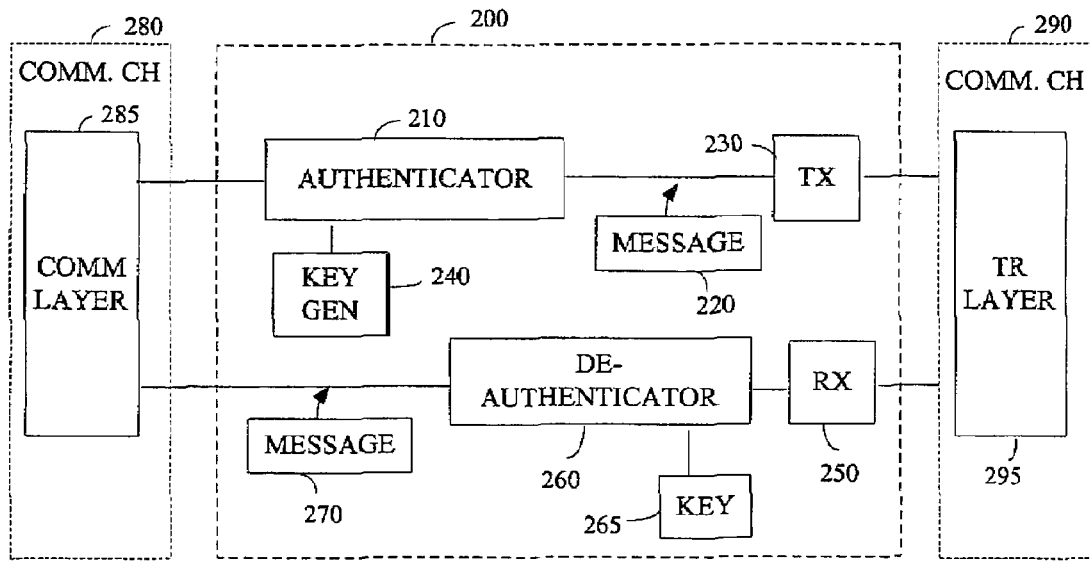
FIG. 2 is a schematic illustration of a block diagram of a network processor according to some exemplary embodiments of the present invention.

Turning to FIG. 2, an illustration of a schematic block diagram of an network processor 200 according to some exemplary embodiments of the invention is shown. Although the scope of the present invention is not limited to this respect, network processor 200 may be operably coupled to communication channels 280 and 290. Communication (COMM) channel 280 may include one or more communication layer 285. Communication channel 290 may include one or more communication layers, and a transport (TR) layer 295 may be the lowest layer of communication channel 290.

According to this exemplary embodiment of the present invention, network processor 200 may include an authenticator 210 to authenticate voice and/or data messages received from one or more communication layers 285. Authenticator 210 may provide authenticated messages, for example, a message 220, to transmitter (TX) 230. TX 230 may transmit the authenticated messages to transport layer 295 of communication channel 290, if desired. A key generator 240 may provide a key to authenticator 210. Authenticator 210 may provide a message authentication code (MAC) to at least one frame of message 220 according to the key. It should be understood that authenticator 210 may use any MAC known in the art to authenticate message 220.

Although the scope of the present invention is not limited in this respect, network processor 200 may include a receiver (RX) 250 that may receive an authenticated message from transport layer 295. A de-authenticator 260 may de-authenticate the authenticated message according to key 265, if desired. De-authenticator 260 may provide de-authenticated messages, e.g. a de-authenticated message 270, to communication layer 285.

Although the scope of the present invention is not limited in this respect, it should be understood that with some embodiments of the invention an RNC (e.g. RNC 170 of FIG. 1) may include network processor 200. For example, the RNC may include an encryption/decryption unit (not shown) to encrypt voice and data messages. In addition, it should be understood that functions of network processor 200 may be implemented by hardware, by software, or by any combination of hardware and/or software. Furthermore, with embodiments of the invention, network processor 200 may be embedded in one or more network nodes or any other network units, if desired.

Figure 3:
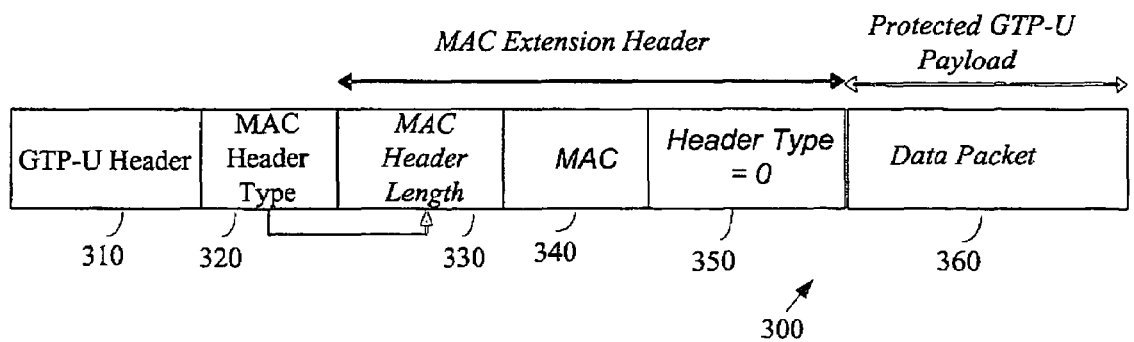
FIG. 3 is a schematic illustration of a frame of a message, helpful is describing a method of authentication according to at least one exemplary embodiment of the present invention.

Turning to FIG. 3, a conceptual diagram of frame 300 of a message, helpful for describing a method of authentication according to at least one exemplary embodiment of the invention is shown. According to an exemplary embodiment of the invention, frame 300 may be a frame of a GPRS tunneling protocol user (GPT-U), and may be transported by a PST interface (e.g. PST interface 125 of FIG. 1). For example, frame 300 may include a GTP-U header 310, a MAC header type 320, a MAC header length 330, a MAC 340, a header type 350 and a data packet 360.

According to some embodiments of the invention, devices that support MAC may receive frame 300 and authenticate data packet 360 according to MAC 340. Devices which do not support MAC may ignore MAC related fields of frame 300, if desired. According to some embodiments of the invention, MAC 340 may include any authentication and integrity protection algorithm, such as, for example, Kasumi f9, Keyed-Hashing for message authentication code—message digest version 5 (HMAC-MD5), HMAC-Secured hash algorithm (HMAC-SHA), or the like According to some embodiments of the invention, a network node (e.g. Node-B of FIG. 1) and/or a RNC (e.g., RNC 170 of FIG. 1) may use an authentication key and/or set of keys to create a MAC for a transmitted message and may verify MAC in messages received from other network elements, if desired. For example, if MAC verification fails, the currently verified frame (e.g. frame 300) may be deemed unauthenticated and/or modified and may not be further processed.

Figure 4:
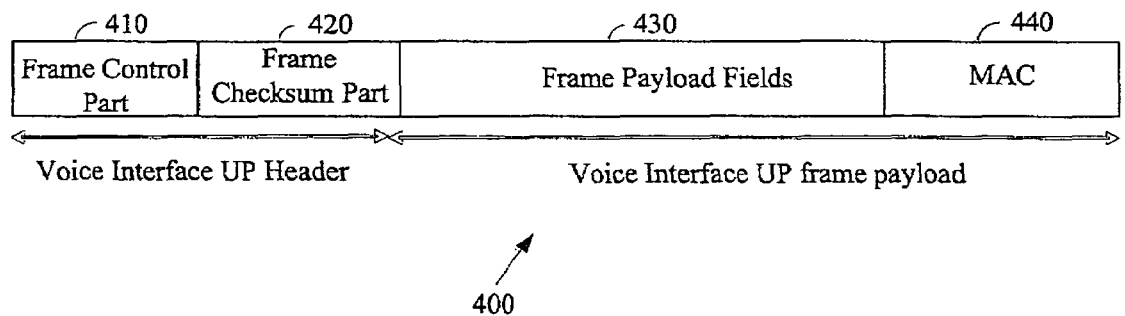
FIG. 4 is a schematic illustration of a frame of a message, helpful in describing a method of authentication according to at least one other exemplary embodiment of the present invention.

Turning to FIG. 4, a conceptual diagram of a frame 400 of a message, helpful for describing a method of authentication according to at least one other exemplary embodiment of the invention is shown. Although the scope of the present invention is not limited in this respect, frame 400 may be used over a CST interface (e.g., CST interface 127 of FIG. 1) and may carry UTRAN user protocol (UP), if desired. According to this exemplary embodiment of the invention, frame 400 may include a frame control part 410, a frame checksum part 420, frame payload fields 430, and a MAC 440.

According to this embodiment of the invention, network nodes (e.g. node-B 160 of FIG. 1) which do not support MAC may ignore MAC 440 of frame 400. In contrast, network nodes that support MAC may use MAC 440 to authenticate fields (e.g., all the fields) of frame 400, for example, including the header, although the scope of the present invention id in no way limited to this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
an authenticator to authenticate a message received from a communication layer of a communication channel, which is higher than a transport layer of the communication channel, wherein the authenticator is to provide a message authentication code to a header extension of a frame, which includes at least one payload field corresponding to the message, and wherein the message authentication code is based at least on the payload field; and
a transmitter to transmit the frame on the transport layer.

2. The apparatus of claim 1, comprising:
an authentication key generator to provide an authentication key,
wherein the authenticator is able to generate the message authentication code according to the authentication key.

3. The apparatus of claim 1, wherein the message comprises an authenticated data packet.

4. The apparatus of claim 1 including a receiver to receive an authenticated message from the transport layer; and a de-authenticator to de-authenticate the received authenticated message and provide the de-authenticated message to the communication layer.

5. The apparatus of claim 1, wherein the authenticator is able to provide the frame with:
a message authentication code header type corresponding to the message authentication code; and
a message authentication code header length corresponding to the message authentication code.

6. The apparatus of claim 1 is a network processor.

7. A method comprising:
authenticating a message received from a communication layer of a communication channel, which is higher than a transport layer of the communication channel, wherein the authenticating includes providing a message authentication code to a header extension of a frame, which includes at least one payload field corresponding to the message, and wherein the message authentication code is based at least on the payload field; and
transmitting the frame over the transport layer.

8. The method of claim 7, wherein authenticating comprises:
generating the message authentication code according to an authentication key.

9. The method of claim 7, comprising:
receiving an authenticated message from the transport layer;
de-authenticating the received authenticated message; and
providing the de-authenticated message to the communication layer.

10. A cellular communication system comprising:
a radio network controller having a network processor, wherein the network processor comprises:
an authenticator to authenticate a message received from a communication layer of a communication channel, which is higher than a transport layer of the communication channel, wherein the authenticator is to provide a message authentication code to a header extension of a frame, which includes at least one payload field corresponding to the message, and wherein the message authentication code is based at least on the payload field; and
a transmitter to transmit the frame on the transport layer.

11. The cellular communication system of claim 10, wherein the network processor comprises:
an authentication key generator to provide an authentication key,
wherein the authenticator is able to determine the message authentication code according to the authentication key.

12. The cellular communication system of claim 10, wherein the message comprises an authenticated data packet.

13. The cellular communication system of claim 10, wherein the network processor includes a receiver to receive an authenticated message from the transport layer; and a de-authenticator to de-authenticate the received authenticated message and provide the de-authenticated message to the communication layer.

14. The cellular communication system of claim 10, wherein authenticator is able to provide the frame with:
a message authentication code header type corresponding to the message authentication code; and
a message authentication code header length corresponding to the message authentication code.

15. The cellular communication system of claim 10, comprising:
a mobile equipment capable of receiving the authenticated message via the transport layer.

16. The cellular communication system of claim 10, comprising:
a physical link interface to couple between one or more units of the cellular communication system, wherein the interface includes the transport layer.

17. A radio network controller comprising:
a network processor including an authenticator to authenticate a message received from a communication layer of a communication channel, which is higher than a transport layer of the communication channel, wherein the authenticator is to provide a message authentication code to a header extension of a frame, which includes at least one payload field corresponding to the message, and wherein the message authentication code is based at least on the payload field; and a transmitter to transmit the frame on the transport layer.

18. The radio network controller of claim 17, wherein the network processor comprises:
an authentication key generator to provide an authentication key, wherein the authenticator is able determine the message authentication code according to the authentication key.

19. The radio network controller of claim 17, wherein the network processor includes a receiver to receive an authenticated message from the transport layer; and a de-authenticator to de-authenticate the received authenticated message and provide the de-authenticated message to the communication layer.

20. The radio network controller of claim 17, wherein authenticator is able to provide the frame with:
a message authentication code header type corresponding to the message authentication code; and
a message authentication code header length corresponding to the message authentication code.

* * * * *

UNITED STATES PATENT AND TRADEMARK OFFICE
CERTIFICATE OF CORRECTION

PATENT NO. : 7,681,031 B2
APPLICATION NO. : 11/167125
DATED : March 16, 2010
INVENTOR(S) : Pawel Matusz et al.

It is certified that error appears in the above-identified patent and that said Letters Patent is hereby corrected as shown below:

In column 6, line 51, in claim 18, after "able" insert -- to --.

Signed and Sealed this

First Day of June, 2010

David J. Kappos
*Director of the United States Patent and Trademark Office*